3,097,957
COATING COMPOSITION WITH BLOCKED ALCOHOLATES THEREIN

Ober C. Slotterbeck, Rahway, and John F. McKay, deceased, late of Cranford, N.J., by C. Winifred McKay, administratrix, Cranford, N.J., assignors to Esso Research and Engineering Company, a corporation of Delaware
No Drawing. Filed June 18, 1959, Ser. No. 821,100
7 Claims. (Cl. 106—285)

This invention relates to a method for preparing a coating composition with a blocked metal alcoholate therein and more particularly to an improved film therefrom.

It is known in the art to provide a polydiolefin coating composition which has been chemically modified with an anhydride of an unsaturated dicarboxylic acid to incorporate oxygen therein. If, however, this coating composition is used as an undercoat for can linings, eyeholing may occur on the surface of the metal. Eyeholes are craters and/or holidays which are caused by small imperfections on the metal. Eyeholing is undesirable for two reasons. Firstly, part of the metal surface is not protected; and, secondly, the appearance of the end product is relatively poor. Additives which have been incorporated into the coating composition, prior to this invention, may have improved the metal wetting properties, but these additives have caused excessive viscosity instability which has the deleterious effect of gelling the system.

In the past, metal alcoholates, per se, have been added to a polydiolefin which has not been chemically modified with an anhydride, and eyeholing does not occur when this admixture is used as coating composition. In contrast, gelation immediately occurs, when a metal alcoholate, e.g., aluminum tri-isopropylate, is mixed with a polydiolefin which has been modified with an anhydride; therefore, the composition cannot be utilized to coat the surface of metals, e.g., tin plate.

It has now been discovered that both eyeholing and gelation can be alleviated by incorporating a blocked metal alcoholate in the chemically modified polydiolefin. Thus, in accordance with one embodiment of this invention, a polymer of a $C_4$ to $C_6$ conjugated diolefin is prepared. The polydiolefin is subsequently modified by combining the polymer with an anhydride of an unsaturated dicarboxylic acid, e.g., maleic anhydride. A blocked metal alcoholate, e.g., the reaction product of aluminum isopropylate and 2-ethyl hexanoic acid, is then mixed with the chemically modified polydiolefin. The admixture therefrom is applied to a surface; and the coated surface is subsequently cured to provide a smooth uniform film.

The polymeric oils of this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about —15° C. and 200° C., in amounts ranging from 100 to 500 parts per 100 parts of monomers; preferred diluents are aliphatic hydrocarbons such as naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of polydiolefins in the presence of an alkali metal or peroxide catalyst is described in U.S. Patents 2,762,851 and 2,586,594, which are incorporated herein by reference.

The aforementioned polydiolefin is then chemically modified by reacting the polymer with an anhydride of an unsaturated dicarboxylic acid, e.g., maleic anhydride, chloromaleic anhydride or citraconic anhydride. This can be accomplished by adding maleic anhydride, which is the preferred anhydride, to the reactants before they are polymerized. However, a more suitable method is to add maleic anhydride after polymerization and heat the mixture therefrom to a temperature between 50° to 250° C., preferably 180° to 220° C. for about 15 minutes to 2 hours. The unsaturated anhydride is generally incorporated within the range of 0.01 to 2.5 parts by weight, preferably 0.05 to 1.0 part, per 100 parts of polymer. This procedure is described in U.S. Patent 2,652,342 which is also incorporated herein by reference.

In accordance with this invention, a blocked metal alcoholate is subsequently mixed with the polydiolefin which has been chemically modified with an unsaturated anhydride. A blocked metal alcoholate in this invention is defined as the reaction product of a metal alcoholate with a carboxylic acid in which at least one or more of the reactive alcoholate groups is replaced by an organic acid group as indicated in the equation herebelow:

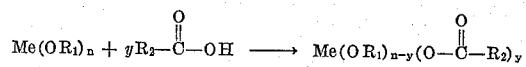

wherein Me is a di- or tri-valent metal, e.g., aluminum or magnesium; $R_1$ is an alkyl group having 2 to 8 carbon atoms, e.g., ethyl, isopropyl, and octyl; $R_2$ is another alkyl group having 6 to 18 carbon atoms to form a carboxylic acid, e.g., hexanoic acid, 2-ethyl hexanoic acid, lauric and oleic; $n$ varies between 2 and 3; $y$ varies between 1 and $n$; and $n-y$ varies between 0 and $n$. The preferred carboxylic acid is 2-ethyl hexanoic acid. Furthermore, it is also preferred to replace two or three of the isopropylate groups with the 2-ethyl hexanoic group as shown in structures (1) and (2) herebelow:

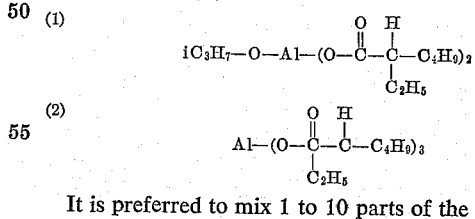

It is preferred to mix 1 to 10 parts of the blocked metal alcoholate per 100 parts by weight of polymer. The admixture, therefrom, does not gel and therefore an improved coating composition has been prepared in the instant invention.

It may be advantageous, although not necessary, to include a $C_4$ to $C_{10}$ alcohol, e.g., n-butanol, 2-hexanol, 2-ethyl hexanol, n-octanol, or decyl alcohol, in the admixture. The alcohol will generally be present in the admixture within the range of 0 to 10 parts, preferably 2 to 5 parts, per 100 parts by weight of polymer.

The surface of a material, such as a metal, e.g., tin plate, is then coated with this admixture. The thickness of the coating may vary over a wide range, but generally it will be between 0.1 and 0.5 mil. The coated surface is subsequently cured by the usual methods known in the art, e.g., baking and flame curing. A suitable method is to bake in an oven at a temperature between 350° and 400° F. for 15 to 5 minutes.

temperature of 400° F. The eyehole rating of the film was determined and the viscosity of the coating composition was measured. These values are recorded in Table I.

*Table I*

| Films | Modified Polydiolefin (parts by wt.) | Alcoholate Incorporated | Alcoholate (parts) | Alcohol (parts) | Eyehole Rating | Viscosity (Poises @ 77°F.) | | | | |
|---|---|---|---|---|---|---|---|---|---|---|
| | | | | | | Original | 5 Hrs. | 1 Day | 4 Days | 13 Days |
| Control | 100 | | 0 | 0 | 3 | 1.65 | | 1.65 | | |
| A | 100 | (a) | 1 | 0 | 1 | 3.4 | 8.1 gel | | | |
| B | 100 | (a) | 1 | 5 (m) | | 7.5 gel | | | | |
| C | 100 | (b) | 2 | 0 | 1 | Gelled | | | | |
| D | 100 | (c) | 3 | 3 (n) | 0 | 1.25 | | 1.65 | | 2.3 |
| F | 100 | (c) | 1.5 | 3 (n) | 2 | | | | | |
| G | 100 | (d) | 3 | 3 (n) | 0 | 1.4 | | | | 2.25 |
| H | ¹50 | (c) | 3 | 3 (n) | 0 | 1.65 | | | 2.1 | |

¹ Blended with 50 parts of the polydiolefin which was not modified with maleic anhydride.
(a) Al (isopropylate)₃
(b) Al (isopropylate)₂(2-ethyl hexanoic)₁
(c) Al (isopropylate)₁(2-ethyl hexanoic)₂
(d) Al (2-ethyl hexanoic)₃
(m) n-butanol
(n) 2-ethyl hexanol
Rating system for eyeholing:
  0—No eyeholes, excellent.
  1—Occasional, scattered eyeholes, generally acceptable.
  2—Frequent eyeholes.
  3—Normal eyeholing on controls, many imperfections.
  4—Worse than control.

Thus, in accordance with this invention, an improved film is provided for a metal surface. Eyeholing has been eliminated and, therefore, it is now possible to coat cans and comparable items with a polydiolefin which has been chemically modified with an unsaturated anhydride. Furthermore, the coating composition with the blocked metal alcoholates therein does not possess excessive viscosity instability.

The following examples are submitted to illustrate and not to limit this invention.

EXAMPLE I

A butadiene-styrene drying oil was prepared from the following charge:

| | Parts |
|---|---|
| Butadiene-1,3 | 80 |
| Styrene | 20 |
| Varsol ¹ | 200 |
| Dioxane | 40 |
| Isopropanol | 0.2 |
| Sodium ² | 1.5 |

¹ Straight-run mineral spirits; API gravity, 49.0; flash, 105° F.; boiling range, 150° to 200° C.; solvent power, 33–37 kauri-butanol value, n-heptane 25.4 K.B. value.
² Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the nonvolatile portion thereof had an average molecular weight of about 8,000. This copolymer was chemically modified by incorporating 1–2 parts of maleic anhydride therein by heating at a temperature of 230° C. for 1 hour. Various alcoholates were mixed with this chemically modified copolymer as indicated in Table I. Each coating composition therefrom was applied to a surface of 0.25# electrolytic tin plate in thicknesses of about 0.3–0.5 mil. The surface of each tin plate, with the coating thereon, was cured for 10 minutes in an oven at a temperature of 400° F.

This example demonstrates that a metal alcoholate which is not blocked, e.g., aluminum isopropylate, will not eliminate gelling or eyeholing in a film which is provided from a polydiolefin modified with maleic anhydride. Furthermore, it is necessary when utilizing a blocked aluminum isopropylate to have two or three isopropylate groups replaced by acid groups, e.g., 2-ethyl hexanoic groups. In addition, it is advantageous to utilize between 2 and 5 parts of a blocked aluminum isopropylate since 1.5 parts is not entirely satisfactory. It should also be noted that a blend of chemically modified and unmodified polydiolefin can be mixed with a blocked alcoholate to provide a film therefrom without eyeholing occurring therein.

EXAMPLE II

The copolymer of butadiene with styrene was chemically modified with maleic anhydride as described in Example I. Various compounds were mixed with the modified polydiolefin to provide a coating composition which was subsequently applied to a surface and cured to a supported film. All of these additives were ineffective (0.5–3 parts) in eliminating eyeholing and/or they gelled the coating composition. The compounds which are inoperative for this invention are listed below in Table II.

*Table II*

Phosphoric acid
Phosphoric acid plus alcohol
Lauryl alcohol ($C_{12}$)
Octanone-1
Isopropyl titanate
Triethanolamine titanate
Mn, Co and Zn driers
Ethyl hexyl titanate and silicone oil
Butylated hydroxy anisole
Triphenyl phosphite
Diphenyl phosphite
Di-n-butyl phosphate
Silicone oil
Trichloroacetic acid
Hexamethylene diamine
2,6 di-t-butyl para cresol
Ammonia
Tetramethyl ammonium hydroxide
Benzyl tetramethyl ammonium hydroxide Sodium isopropylate
Al (isopropylate)$_2$(ethyl hexanoic)$_1$
Ethyl hexyl titanate plus Co, Mn and Zn driers
Tolylene diisocyanate
Blocked isocyanates
Mono-n-butyl ester of a polyolefin modified with maleic anhydride
Di-n-butyl ester of a polyolefin modified with maleic anhydride
Mono-iso-octyl ester of a polyolefin modified with maleic anhydride
Di-iso-octyl ester of a polyolefin modified with maleic anhydride
Each of four above compounds plus Al (isopropylate)$_3$
Each of four above compounds plus blocked Al isopropylate Al (isopropylate)$_2$(phenolate)
Al (phenolate)(ethyl hexanoate)$_2$
Dibutyl tin maleate
Bis (tri-n-butyl tin) oxide
Dibutyl tin diacetate
Butyl tin trichloride Having described the general nature and specific embodiments of the present invention, the true scope is now particularly pointed out in the appended claims.

What is claimed is:
1. A composition of matter consisting essentially of:
   (1) 100 parts of a liquid polymer selected from the class consisting of poly $C_4$ to $C_6$ conjugated diolefins and the copolymers of 0 to 25 wt. percent of styrene with said diolefins; which have been reacted with
   (2) 0.01 to 2.5 parts of an anhydride of an unsaturated carboxylic acid selected from the class consisting of maleic anhydride, chloromaleic anhydride, and citraconic anhydride;
   (3) 1 to 10 parts of a blocked metal alcoholate which has the formula:

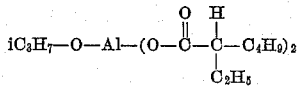

2. The composition of claim 1 in which the polymer is a copolymer of 78–85 wt. percent of butadiene and 20–15 wt. percent of styrene.

3. The composition of claim 1 in which the polymer is polybutadiene.

4. A method for coating a metal base consisting essentially of:
   (1) preparing a liquid polymer selected from the class consisting of poly $C_4$ to $C_6$ conjugated diolefins and the copolymers of 0 to 25 wt. percent of styrene with said olefins; which has been reacted with 0.01 to 2.5 parts of an anhydride of an unsaturated carboxylic acid selected from the class consisting of maleic anhydride, chloromaleic anhydride and citraconic anhydride;
   (2) mixing said reacted polymer with 1 to 10 parts per 100 parts by weight of polymer of a blocked metal alcoholate which has the formula:

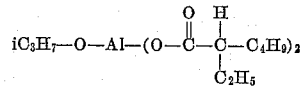

(3) coating a base surface with said mixture; and
   (4) curing said coating to provide a uniform film.

5. The method of claim 4 wherein the polymer is polybutadiene.

6. The method of claim 5 wherein the polymer is the copolymer of 75 to 85% butadiene with 25 to 15% styrene.

7. The method of claim 6 wherein between 2 and 5 parts of blocked alcoholate are utilized per 100 parts by weight of polymer.

References Cited in the file of this patent
UNITED STATES PATENTS

| | | |
|---|---|---|
| 2,768,908 | Cull | Oct. 30, 1956 |
| 2,835,685 | Rinse | May 20, 1958 |
| 2,871,135 | Weiss | Jan. 27, 1959 |
| 3,025,258 | Hicks | Mar. 13, 1962 |

FOREIGN PATENTS

| | | |
|---|---|---|
| 836,981 | Germany | Apr. 17, 1952 |

OTHER REFERENCES

J. Weiss: J. of Oil and Color Chemists Assn., vol. 40, pages 863–879; 976–989, 1957, note page 865.